(No Model.)
F. FOSDICK.
STEAM ENGINE.
No. 569,628.    Patented Oct. 20, 1896.
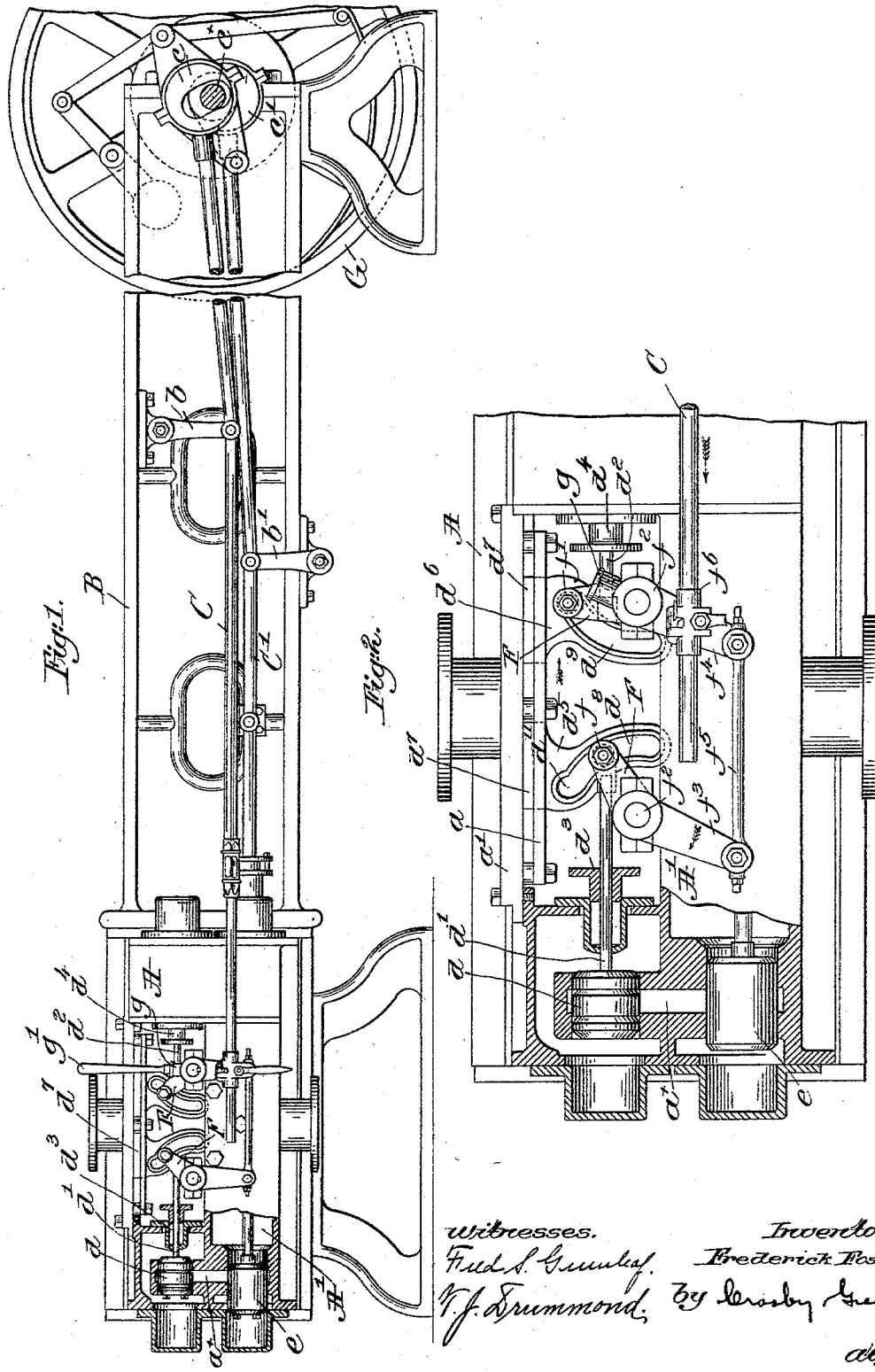
Witnesses.
Fred S. Greenleaf.
T. J. Drummond.
Inventor
Frederick Fosdick.
By Crosby Gregory
Attys.

UNITED STATES PATENT OFFICE.

FREDERICK FOSDICK, OF FITCHBURG, MASSACHUSETTS.

STEAM-ENGINE.

SPECIFICATION forming part of Letters Patent No. 569,628, dated October 20, 1896.

Application filed January 23, 1896. Serial No. 576,481. (No model.)

*To all whom it may concern:*

Be it known that I, FREDERICK FOSDICK, of Fitchburg, county of Worcester, and State of Massachusetts, have invented an Improvement in Steam-Engines, of which the following description, in connection with the accompanying drawings, is a specification, like letters on the drawings representing like parts.

This invention has for its object to provide an improved valve-actuating mechanism for steam-engines.

In the accompanying drawings, illustrative of my invention, Figure 1, in side elevation, shows a sufficient portion of an engine equipped with a valve mechanism embodying my invention to enable the same to be understood. Fig. 2 is an enlarged detail of a portion of Fig. 1, showing the valve-actuating mechanism in a different position.

In the embodiment of my invention herein shown the cylinder A, its steam-chest A', the frame B, a valve-rod C C', suitably supported on the rock-arms $b$ $b'$ and driven in suitable manner, as by the eccentrics $c$ $c'$ on the crank-shaft $c^x$, are and may be of usual or desired construction so far as concerns my present invention.

In the engine herein shown the cylinder is provided with two ports arranged adjacent the opposite ends of the cylinder, one only being herein shown at $a^x$. Each port $a^x$ is controlled, in the present instance of my invention, by separate steam and exhaust valves $d$ $e$, (shown as piston-valves,) the valves at one end of the cylinder only being shown, it being understood that the arrangement at the opposite end of the cylinder is similar. The valve-stems $d'$ $d^2$ of the two steam-valves are shown as passed through suitable stuffing-boxes $d^3$ $d^4$, and at their ends opposite their respective valves are connected herein fixedly with the cams $d^5$ $d^6$, provided at their upper ends with laterally-extended guiding lips or flanges $d^7$, arranged to travel in suitable guideways formed between the guide $a$ and $a'$. The cams $d^5$ $d^6$ are provided with similar though opposite cam-surfaces, (shown as in the form of cam-slots $d^8$ $d^9$,) which receive the roller or other suitable pins $f$ $f'$ on the wrist-plates F, fast on the rock-shafts $f^2$, provided, respectively, with the depending cranks $f^3$ $f^4$, connected by a link $f^5$, to cause them to move in unison, they being operated through the valve-rod C, pivotally and adjustably connected with one of the cranks, as $f^4$, at $f^6$. The cam-slots $d^8$ $d^9$ are so shaped that the cam-surfaces formed thereby through the greater part of their lengths are concentric with the axes of the rock-shafts $f^2$, so that the pins $f f'$, when reciprocated by and about the axes of the said rock-shafts, will travel in contact with said cam-surfaces without moving the latter or their connected steam-valves. At one of their ends, however, in the present instance their upper ends, the cam-slots $d^8$ $d^9$ are provided with abrupt laterally-extended recesses or pockets, which, as the roller-pins $f f'$ enter thereinto, cause their respective cams and valves to receive a quick movement. Thus the roller-pins throughout the greater part of their movement travel in contact with the concentric portions of the cam-surfaces, and hence impart no movement to the valves. When the rollers enter the pockets $d^{11}$, the cams and connected valves will be given a sharp opening movement, and as the said rollers commence their return movement said cams and valves will be as quickly moved in the return or opposite direction to cut off the steam.

While the valve movement described is quick, yet the valves are started gradually from a condition of rest and are returned as gradually to a condition of rest, so that there is an entire absence of any shock or movement which will produce objectionable noise or operate injuriously upon the mechanism.

It is of course evident from the drawings that the opposite arrangement of the cam-surfaces will cause the steam-valves to be alternately moved.

The exhaust-valves $e$ are connected directly with and to be operated by the valve-rod C'.

To operate the valves by hand, I have provided a socket $g$ on one of the rock-shafts to receive the bar $g'$. (Shown only in Fig. 1.)

My improved mechanism described is simple in construction, easy of operation, and imparts the most desirable movements to the valves.

If desired, the movements of the valve-actuating rod or rods may be governed by a suitable automatic regulator or governor, as, for instance, a usual shaft-governor, typified at G.

My invention is not limited to the particular embodiment herein shown and described, for it is evident the same may be varied without departing from the spirit and scope of my invention.

What I claim is—

1. A valve mechanism for steam-engines, comprising a valve, a rock-shaft, means to actuate the latter and a reciprocating cam having a rectilinear movement interposed between said valve and rock-shaft and actuated by the latter, substantially as described.

2. A valve mechanism for steam-engines, comprising a valve, an actuating-cam connected thereto, and a rocking actuator engaging said cam, to operate the same, substantially as described.

3. A valve mechanism for steam-engines, comprising valves, reciprocating cams having rectilinear movements connected with and to actuate the respective valves, rocking actuators for and in engagement with the respective cams, and means to move the said actuators, substantially as described.

4. In a valve mechanism, a crank, a rock-shaft, a wrist plate and pin, carried by said rock-shaft, the valve, a cam connected with and to operate the same, said cam having a cam-surface coöperating with and driven by said pin, said cam-surface for the greater part of its length being concentric with said rock-shaft and terminating in an offset portion, whereby said cam and its valve remain substantially inactive during the movement of said pin on said concentric cam-surface and are moved quickly by the coöperation of said pin with said offset cam-surface, substantially as described.

5. A valve mechanism, comprising a wrist-pin, an operating-rod therefor driven by an eccentric or other moving part, a cam attached directly to the valve-stem, and slotted for a greater part of its length to conform to the path of movement of said wrist-pin, and provided with an offset portion, to give to the valve a quick opening and closing movement, substantially as described.

6. The combination with the steam-valves of an engine, of means to give the valves positive and alternately intermittent motion, said means comprising cams connected to said valves and having rectilinear movements, and means to operate said cams from a moving part of the engine, substantially as described.

7. The combination with the steam-valves of an engine, of means to impart to said valves positive and alternately intermittent motion, said means comprising cams connected to said valves and having rectilinear movements, actuating mechanism for the cams and an automatic cut-off device responsive to changes in the speed of the engine to vary the operation of said actuating mechanism, substantially as described.

8. A valve mechanism for steam-engines, comprising valves, cams positively connected with and to actuate the respective valves, actuators for and in engagement with the respective cams, and means to move said actuators, substantially as described.

9. The combination with the steam-valves of an engine, of means to impart to said valves positive and alternately intermittent movement, said means comprising cams positively connected with and to actuate said valves, and means to operate said cams for a moving part of the engine, substantially as described.

10. The combination with the steam-valves of an engine, of means to impart to said valves positive and alternately intermittent movement, said means comprising cams positively connected with and to actuate said valves, actuating mechanism for said cams, and an automatic cut-off device to respond to changes of speed in the engine to vary the operation of said actuating mechanism, substantially as described.

In testimony whereof I have signed my name to this specification in the presence of two subscribing witnesses.

FREDERICK FOSDICK.

Witnesses:
FREDERICK L. EMERY,
EMMA J. BENNETT.